US012603409B2

(12) United States Patent
Liao et al.

(10) Patent No.: US 12,603,409 B2
(45) Date of Patent: Apr. 14, 2026

(54) HIGH-FREQUENCY TRANSMISSION ELEMENT

(71) Applicants: Global Unichip Corporation, Hsinchu (TW); Taiwan Semiconductor Manufacturing Company, Ltd., Hsinchu (TW)

(72) Inventors: Huan-Yi Liao, Hsinchu (TW); Yu-Lin Cheng, Hsinchu (TW); Chi-Lou Yeh, Hsinchu (TW); Sheng-Fan Yang, Hsinchu (TW)

(73) Assignees: Global Unichip Corporation, Hsinchu (TW); Taiwan Semiconductor Manufacturing Company, Ltd., Hsinchu (TW)

( * ) Notice: Subject to any disclaimer, the term of this patent is extended or adjusted under 35 U.S.C. 154(b) by 419 days.

(21) Appl. No.: 18/298,357

(22) Filed: Apr. 10, 2023

(65) Prior Publication Data

US 2024/0322413 A1 Sep. 26, 2024

(30) Foreign Application Priority Data

Mar. 22, 2023 (TW) ................................ 112110568

(51) Int. Cl.
*H01P 5/107* (2006.01)
*H01P 1/00* (2006.01)
(Continued)

(52) U.S. Cl.
CPC .................. *H01P 3/08* (2013.01); *H01P 1/00* (2013.01); *H01P 5/1022* (2013.01); *H01P 5/107* (2013.01)

(58) Field of Classification Search
CPC .. H01P 5/107; H01P 5/085; H01P 5/08; H01P 5/087; H01P 5/10; H01P 5/1022;
(Continued)

(56) References Cited

U.S. PATENT DOCUMENTS 9,450,281 B2 9/2016 Kim
2005/0190614 A1* 9/2005 Brunette .............. H05K 1/0222 365/192
(Continued)

FOREIGN PATENT DOCUMENTS

CN 203339299 12/2013
TW 201515530 4/2015
(Continued)

OTHER PUBLICATIONS

"Office Action of Taiwan Counterpart Application", issued on Feb. 26, 2024, p. 1-p. 5.

*Primary Examiner* — Stephen E. Jones
(74) *Attorney, Agent, or Firm* — JCIPRNET

(57) ABSTRACT

A high-frequency transmission element is provided. The high-frequency transmission element includes a connecting wire structure and an impedance matching plate structure. The connecting wire structure includes a connecting wire and a connecting pad. The connecting pad is located at an end of the connecting wire. The impedance matching plate structure includes an impedance matching plate body, an opening, and an impedance matching portion. The connecting pad is located in a projection range of the opening in a direction of orthographic projection of the impedance matching plate structure. The impedance matching portion is located in a periphery of the opening and extends in the direction from the connecting wire towards the connecting pad.

9 Claims, 8 Drawing Sheets

(51) Int. Cl.
*H01P 3/08* (2006.01)
*H01P 5/10* (2006.01)

(58) Field of Classification Search
CPC ........ H01P 1/00; H05K 1/025; H05K 1/0251; H05K 1/0253; H03H 7/38
See application file for complete search history.

(56) References Cited

U.S. PATENT DOCUMENTS

| | | | | |
|---|---|---|---|---|
| 2010/0289596 | A1* | 11/2010 | Makino | H01P 5/085 333/32 |
| 2016/0111764 | A1* | 4/2016 | Kim | H01P 5/024 333/248 |

FOREIGN PATENT DOCUMENTS

| | | |
|---|---|---|
| TW | 202105637 | 2/2021 |
| TW | I750912 | 12/2021 |
| TW | 202217988 | 5/2022 |

* cited by examiner

HIGH-FREQUENCY TRANSMISSION ELEMENT

CROSS-REFERENCE TO RELATED APPLICATION

This application claims the priority benefit of Taiwan application serial no. 112110568, filed on Mar. 22, 2023. The entirety of the above-mentioned patent application is hereby incorporated by reference herein and made a part of this specification.

BACKGROUND

Technical Field

The disclosure relates to a signal transmission element, and more particularly to a high-frequency transmission element.

Description of Related Art

In current high-frequency signal transmission designs (e.g., SerDes), the transmission line is electrically connected to the connecting pad of the high-frequency signal transmission element. The impedance mismatch between transmission line and other structures of the high-frequency signal transmission element will cause internal loss such as return loss and insertion loss on the transmission channel. Thus, how to improve the impedance matching between the transmission line and the connecting pad to reduce the internal loss of the high-frequency signal transmission element is one of the research focuses of the technicians in this field.

SUMMARY

The disclosure provides a high-frequency transmission element that may improve the impedance matching between a transmission line and a connecting pad.

The high-frequency transmission element of the disclosure includes a connecting wire structure and an impedance matching plate structure. The connecting wire structure is disposed in a first layer of the high-frequency transmission element. The connecting wire structure includes a connecting wire and a connecting pad. The connecting pad is located at an end of the connecting wire. The impedance matching plate structure is disposed in a second layer of the high-frequency transmission element. The impedance matching plate structure includes an impedance matching plate body, an opening, and an impedance matching portion. The connecting pad is located in a projection range of the opening in a direction of orthographic projection of the impedance matching plate structure. The impedance matching portion is located in a periphery of the opening and extends in the direction from the connecting wire to the connecting pad. The first layer and the second layer are separated by a non-zero pitch distance.

Based on the above, the impedance matching plate structure disposed in the second layer includes the impedance matching plate body, the opening, and the impedance matching portion. The connecting pad is located in a projection range of the opening in a direction of orthographic projection of the impedance matching plate structure. The impedance matching portion is located in a periphery of the opening and extends in the direction from the connecting wire to the connecting pad. The first layer and the second layer are separated by a non-zero pitch distance. The disclosure uses the impedance matching portion to realize the impedance matching between the transmission line and the connecting pad. In this way, the impedance matching between the transmission line and the connecting pad may be improved.

In order to make the above-mentioned features and advantages of the disclosure comprehensible, embodiments accompanied with drawings are described in detail below.

DESCRIPTION OF THE EMBODIMENTS

A portion of the embodiments of the disclosure will be described in detail with reference to the accompanying drawings. Element symbol referenced in the following description will be regarded as the same or similar element when the same element symbol appears in different drawings. These examples are only a portion of the disclosure and do not disclose all possible embodiments of the disclosure. More precisely, these embodiments are only examples within the scope of the patent application of the disclosure.

Figure 1:
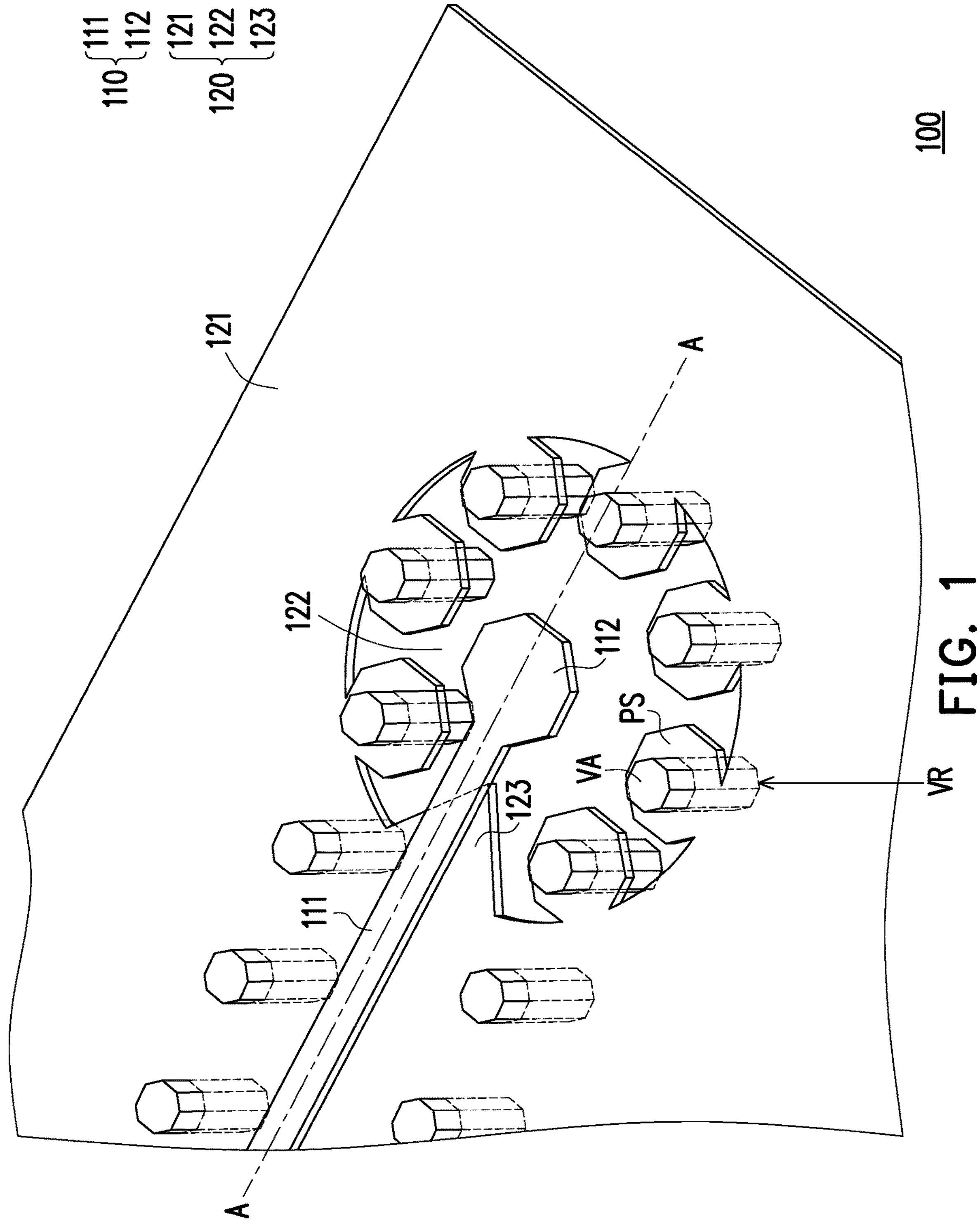
FIG. 1 is a schematic view of a high-frequency transmission element according to an embodiment of the disclosure.
Figure 2:
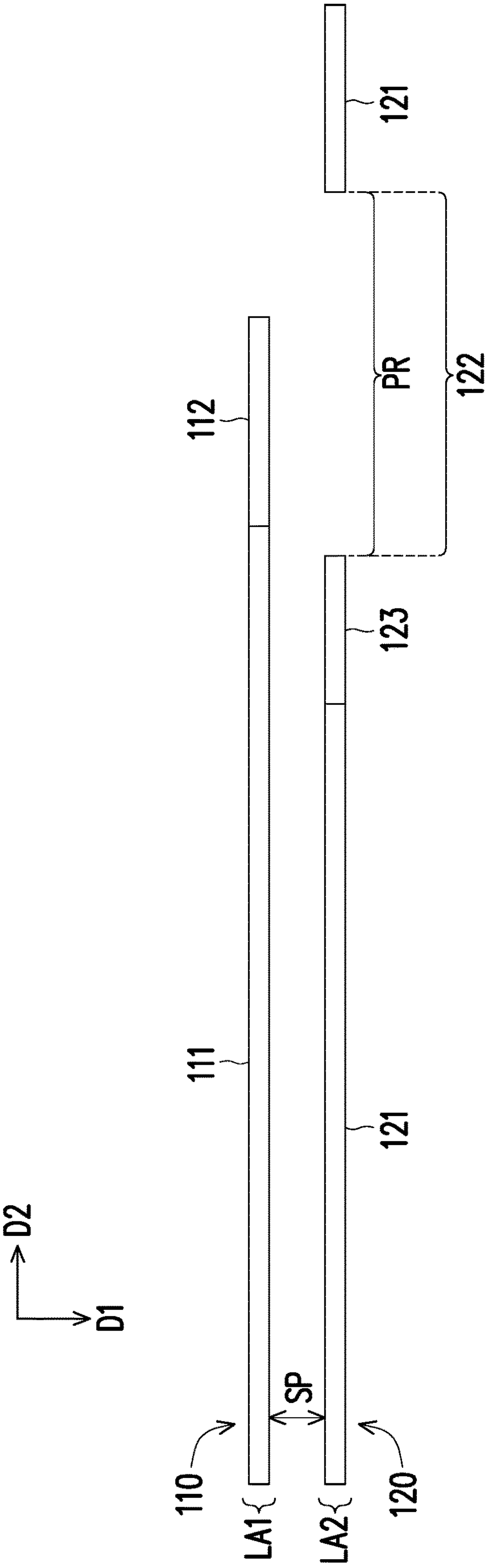
FIG. 2 is a partial cross-sectional view along the line A-A of FIG. 1.

Referring to FIG. 1 and FIG. 2 together, FIG. 1 is a schematic view of a high-frequency transmission element according to an embodiment of the disclosure, and FIG. 2 is a partial cross-sectional view along the line A-A of FIG. 1. In this embodiment, the high-frequency transmission element 100 includes a connecting wire structure 110 and an impedance matching plate structure 120. The connecting wire structure 110 is disposed in a first layer LA1 of the high-frequency transmission element 100. The connecting wire structure 110 includes a connecting wire 111 and a connecting pad 112. The connecting pad 112 is located at an end of the connecting wire 111. The connecting wire structure 110 is configured to transmit high-frequency signal. For example, the connecting wire structure 110 may be at least a portion of a connecting wire used in a high-frequency serializer/deserializer (SerDes) (the disclosure is not limited thereto). For example, the connecting wire structure 110 may be at least a portion of a T-shaped connecting wire used in the main track of the high-frequency SerDes (the disclosure is not limited thereto). In this embodiment, the connecting pad 112 may serve as a contact pad electrically connected with other external elements. In this embodiment, the connecting wire structure 110 may be a microstrip wire structure In this embodiment, the impedance matching plate structure 120 is disposed in a second layer LA2 of the high-frequency transmission element 100. The impedance matching plate structure 120 includes an impedance matching plate body 121, an opening (or "anti-pad") 122, and an impedance matching portion 123. In this embodiment, the connecting pad 112 is located in a projection range PR of the opening 122 in a direction of orthographic projection D1 of the impedance matching plate structure 120. In other words, the connecting pad 112 does not overlap with the impedance matching plate body 121 in the direction of orthographic projection D1.

In some embodiments, the impedance matching plate body 121 may be a circuit board with an electrode structure or an electrode pattern. In some embodiments, the impedance matching plate body 121 may have a conductive layer.

In this embodiment, the impedance matching portion 123 is located in a periphery of the opening 122 and extends in a direction D2 from the connecting wire 111 to the connecting pad 112. In this embodiment, the first layer LA1 and the second layer LA2 are separated by a non-zero pitch distance SP. That is, the connecting wire structure 110 and the impedance matching plate structure 120 are parallel to each other and do not touch each other. Thus, the connecting wire structure 110 and the impedance matching plate structure 120 form a capacitance structure. The connecting pad 112 does not overlap with the impedance matching portion 123 in the direction of orthographic projection D1.

In this embodiment, the first layer LA1 is above the second layer LA2. However, the disclosure is not limited thereto. In some embodiments, the second layer LA2 may be above the first layer LAL.

In this embodiment, the pitch distance SP and the thickness of the impedance matching plate structure 120 are not particularly limited.

It is worth mentioning here that the high-frequency transmission element 100 uses the impedance matching portion 123 to realize the impedance matching between the connecting wire 111 and the connecting pad 112. Further, the high-frequency transmission element 100 has a first capacitance between the impedance matching plate body 121 and the connecting wire 111. The high-frequency transmission element 100 has a second capacitance between the impedance matching portion 123 and the connecting wire 111. The high-frequency transmission element 100 has a third capacitance between the connecting pad 112 and the opening 122. The third capacitance is very low. The first capacitance is significantly greater than the third capacitance. The second capacitance is between the first capacitance and the third capacitance. Thus, the impedance matching portion 123 may buffer a difference between the first capacitance and the third capacitance. In this way, the impedance matching between the connecting wire 111 and the connecting pad 112 may be improved.

Figure 3:
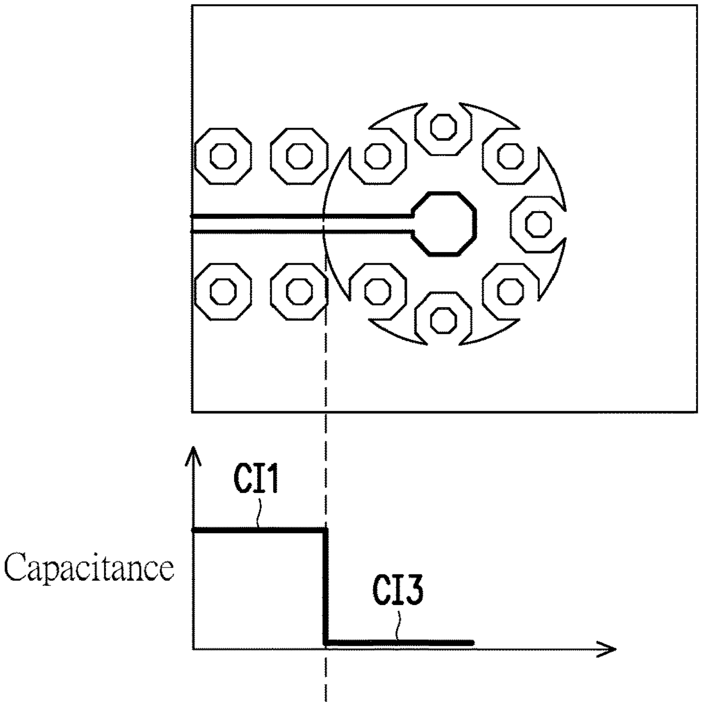
FIG. 3 is a schematic view of a capacitance of an impedance matching plate structure without an impedance matching portion.

Referring to FIG. 3 for further illustration, FIG. 3 is a schematic view of a capacitance of an impedance matching plate structure without an impedance matching portion. The connecting pad 112 does not overlap with the impedance matching plate body 121 (e.g., circuit board) in the direction of orthographic projection D1. Thus, a capacitance CI3 between connecting pad 112 and opening 122 is very low. This makes the connecting pad 112 have a very large transmission impedance. A capacitance CI1 between the impedance matching plate body 121 and the connecting wire 111 is significantly greater than the capacitance CI3. Thus, in response to the high-frequency signal being provided to the connecting pad 112 via the connecting wire 111, internal losses such as return loss and insertion loss occur on the high-frequency signal.

Figure 4A:
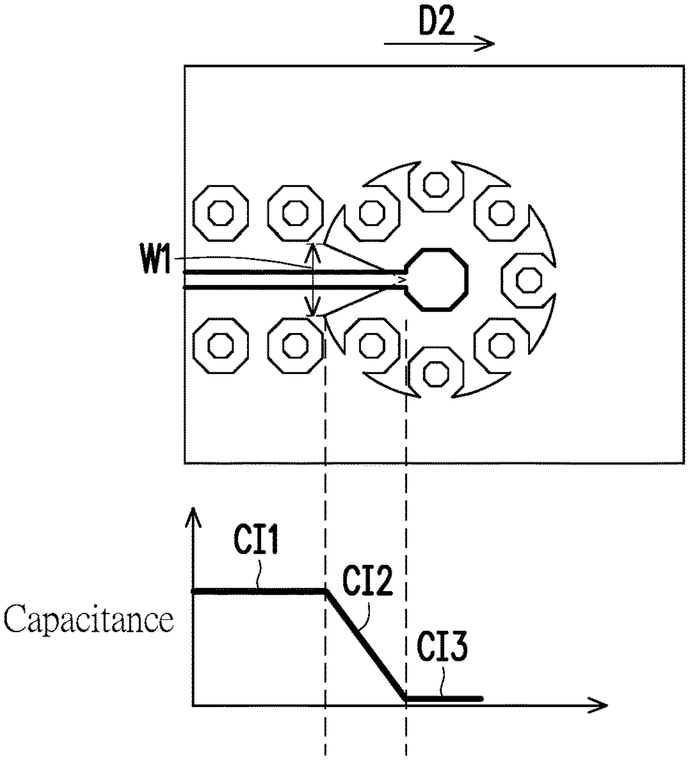
FIG. 4A, FIG. 4B, and FIG. 4C are schematic views of capacitances of impedance matching plate structures with impedance matching portions according to an embodiment of the disclosure, respectively.
Figure 4B:
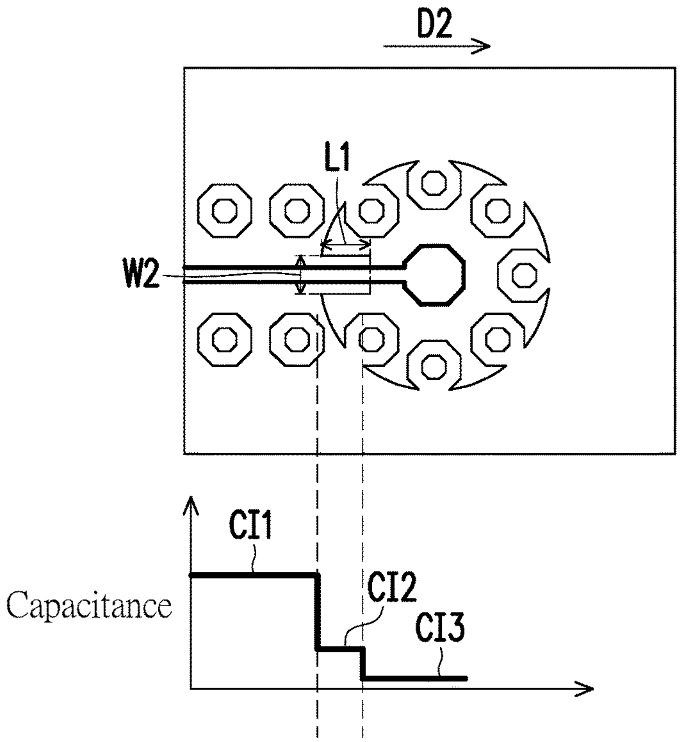
Figure 4C:
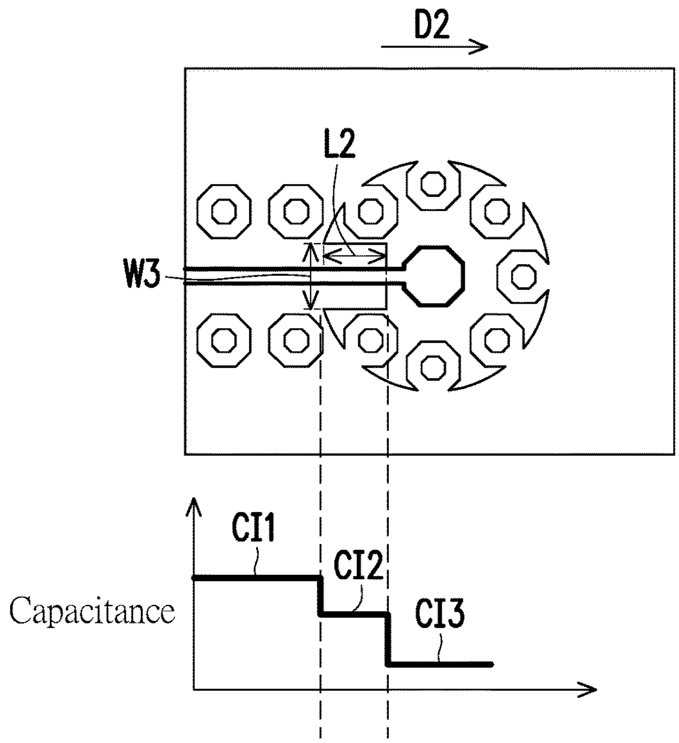

FIG. 4A, FIG. 4B, and FIG. 4C are schematic views of capacitances of impedance matching plate structures with impedance matching portions according to an embodiment of the disclosure, respectively. FIG. 4A, FIG. 4B, and FIG. 4C show different implementations of the impedance matching portion 123, respectively. First, referring to FIG. 2 and FIG. 4A together, in this embodiment, the impedance matching portion 123 has a structure width W. A structure width W1 of the impedance matching portion 123 gradually decreases in the direction D2 from the connecting wire 111 to the connecting pad 112. Thus, the shape of the impedance matching portion 123 in a direction of orthographic projection (direction of orthographic projection D1) of the impedance matching plate structure 120 is a triangle. In some embodiments, the shape of the impedance matching portion 123 in the direction of orthographic projection of the impedance matching plate structure 120 may be a trapezoid. In this embodiment, the structure width W1 of the impedance matching portion 123 gradually decreases in the direction D2 from the connecting wire 111 to the connecting pad 112. Thus, in the case that the connecting pad 112 is not connected to an external circuit, in the direction D2, a capacitance CI2 between the impedance matching portion 123 and the connecting wire 111 gradually decrease from the capacitance CI1 between the impedance matching plate body 121 and the connecting wire 111 to the capacitance CI3 between the connecting pad 112 and the opening 122. In this way, the impedance matching between the connecting wire 111 and the connecting pad 112 may be improved.

Referring to FIG. 2 and FIG. 4B together, in this embodiment, the impedance matching portion 123 has a fixed structure width W2 and an extension length L1 extending along the direction D2. In the case that the connecting pad 112 is not connected to an external circuit, in the direction D2, the capacitance CI2 between the impedance matching portion 123 and the connecting wire 111 is between the capacitance CI1 and the capacitance CI3. In this way, the impedance matching between the connecting wire 111 and the connecting pad 112 may be improved.

Referring to FIG. 2 and FIG. 4C together, in this embodiment, the impedance matching portion 123 has a fixed structure width W3 and an extension length L2 extending along the direction D2. In the case that the connecting pad 112 is not connected to an external circuit, in the direction D2, the capacitance CI2 between the impedance matching portion 123 and the connecting wire 111 is between the capacitance CI1 and the capacitance CI3. In this way, the impedance matching between the connecting wire 111 and the connecting pad 112 may be improved.

It should be noted that the structure width W3 is greater than the structure width W2. In addition, in direction D2, the extension length L2 of the impedance matching portion 123 shown in FIG. 4C is greater than the extension length L1 of the impedance matching portion 123 shown in FIG. 4B. This makes the distance between the connecting pad 112 and the impedance matching portion 123 shown in FIG. 4C relatively close. Thus, the capacitance CI3 in FIG. 4C is greater than the capacitance CI3 in FIG. 4B. In addition, the capacitance CI2 in FIG. 4C is greater than the capacitance CI2 in FIG. 4B.

Based on the above, different implementations of the impedance matching portion 123 shown in FIG. 4A, FIG. 4B, and FIG. 4C may effectively reduce the return loss and insertion loss of the high-frequency signal.

Returning to the embodiment shown in FIG. 1 and FIG. 2, in this embodiment, the high-frequency transmission element 100 further includes multiple reference electrode structures VA. The reference electrode structures VA are electrically connected to a reference voltage VR (e.g., ground). In this embodiment, the reference electrode structures VA may be structures such as columnar electrodes or a vias. The reference electrode structures VA extend along the direction of orthographic projection D1. The reference electrode structures VA are distributed in a periphery of the connecting wire structure 110.

In this embodiment, the impedance matching plate structure 120 further includes multiple protruding structures PS. The protruding structures PS are located in the periphery of the opening 122. The protruding structures PS respectively surround one of the reference electrode structures VA. In addition, the protruding structures PS extend from the periphery of the opening 122 towards a direction of the connecting pad 112 respectively. The protruding structures PS may be regarded as connecting portions of the reference electrode structures VA. The impedance matching plate structure 120 may receive the reference voltage VR through the reference electrode structures VA.

Referring to FIG. 1, in this embodiment, the impedance matching portion 123 is located in the periphery of the opening 122 and extends in the direction D2 from the connecting wire 111 to the connecting pad 112. Thus, a distance between the connecting pad 112 and the impedance matching portion 123 is relatively short, which makes the third capacitance between the connecting pad 112 and the opening 122 slightly higher than an original design capacitance. In order to reduce the third capacitance to the design capacitance, the opening 122 is moderately expanded. Thus, the protruding structures PS are preserved. Moreover, positions of the reference electrode structures VA do not need to be changed in response to the expansion of the opening 122, thereby reducing the design complexity of the high-frequency transmission element 100.

In this embodiment, the shapes of the protruding structures PS are, for example, polygons. The shapes of the protruding structures PS may be adjusted according to actual design requirements, and are not limited to this embodiment.

In some embodiments, the opening 122 may not need to be expanded.

Figure 5:
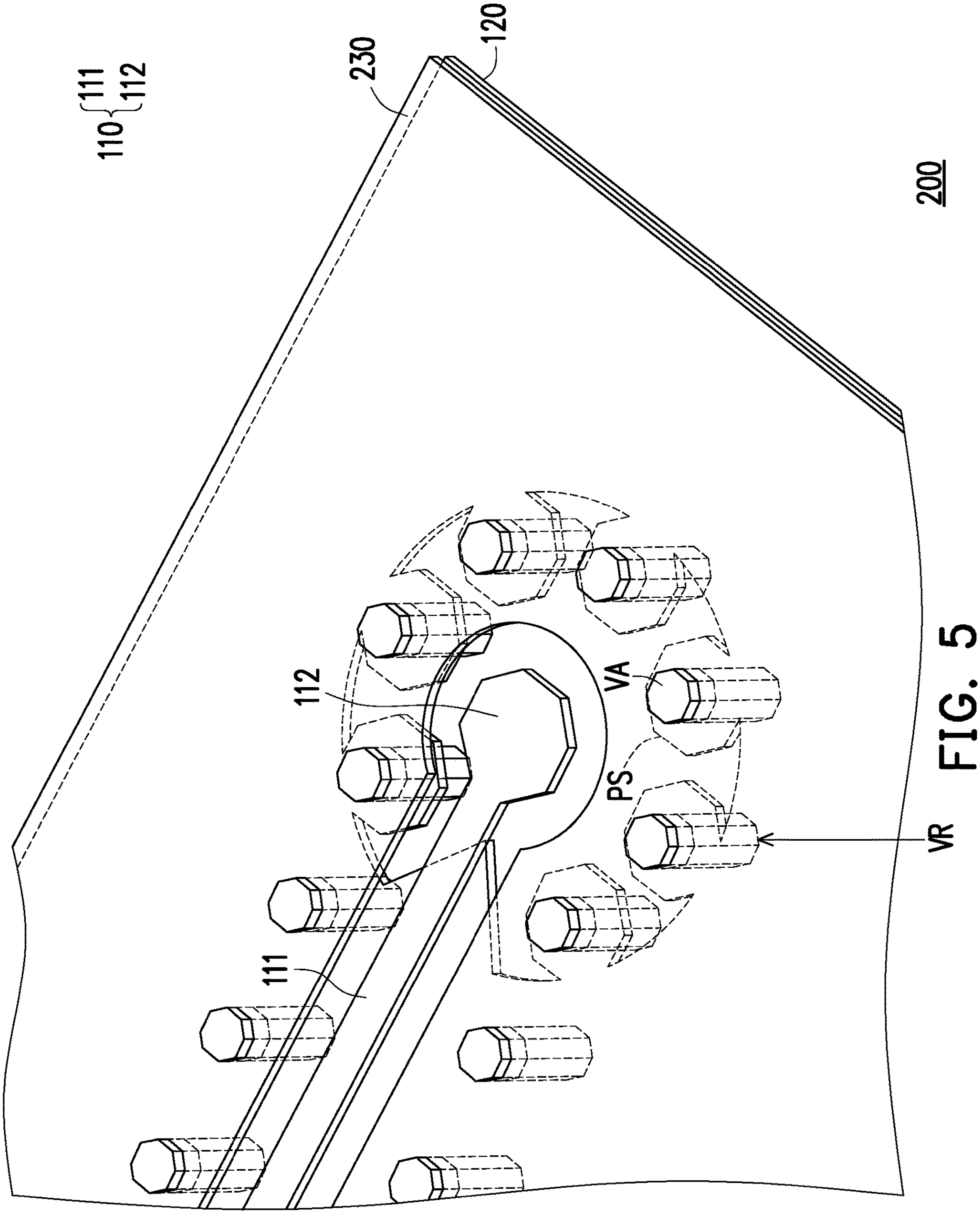
FIG. 5 is a schematic view of a high-frequency transmission element according to an embodiment of the disclosure.

Referring to FIG. 5, FIG. 5 is a schematic view of a high-frequency transmission element according to an embodiment of the disclosure. In this embodiment, the high-frequency transmission element 200 includes a connecting wire structure 110, an impedance matching plate structure 120, and a peripheral layer structure 230. The implementation details of the connecting wire structure 110 and the impedance matching plate structure 120 have been clearly described in the embodiments of FIG. 1 to FIG. 4C, so they will not be repeated herein. In this embodiment, the peripheral layer structure 230 is disposed in the first layer (e.g., the first layer LA1 shown in FIG. 2). The peripheral layer structure 230 is parallel to the impedance matching plate structure 120. The peripheral layer structure 230 surrounds at least a portion of the connecting wire structure 110. The peripheral layer structure 230 is connected to the reference voltage through the reference electrode structures VA. In this embodiment, the reference electrode structures VA may also serve as a support structure for supporting the peripheral layer structure 230.

In some embodiments, the peripheral layer structure 230 may be a circuit board with an electrode structure or an electrode pattern. In some embodiments, the peripheral layer structure 230 may have a conductive layer.

Figure 6:
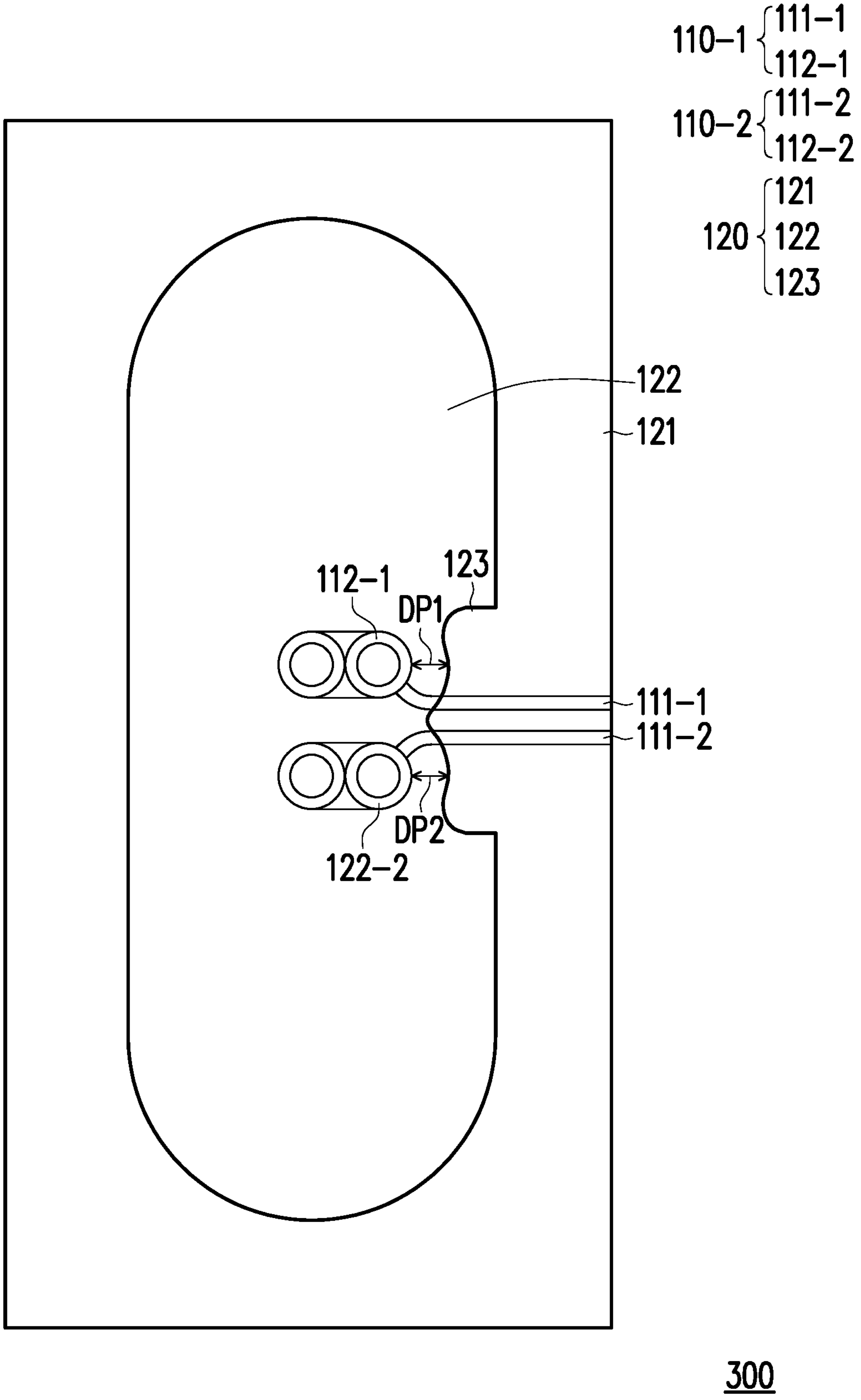
FIG. 6 is a schematic view of a high-frequency transmission element according to an embodiment of the disclosure.

Referring to FIG. 6, FIG. 6 is a schematic view of a high-frequency transmission element according to an embodiment of the disclosure. In this embodiment, the high-frequency transmission element 300 includes connecting wire structures 110-1 and 110-2 and an impedance matching plate structure 120. The connecting wire structures 110-1 and 110-2 are disposed in the first layer of the high-frequency transmission element 100 (e.g., the first layer LA1 shown in FIG. 2). The connecting wire structure 110-1 includes a connecting wire 111-1 and a connecting pad 112-1. The connecting pad 112-1 is located at an end of the connecting wire 111-1. The connecting wire structure 110-2 includes a connecting wire 111-2 and a connecting pad 112-2. The connecting pad 112-2 is located at an end of the connecting wire 111-2. The impedance matching plate structure 120 is disposed in the second layer of the high-frequency transmission element 100 (e.g., the second layer LA2 shown in FIG. 2). In this embodiment, the connecting pads 112-1 and 112-2 are located in a projection range of the opening 122 in a direction of orthographic projection (e.g., the direction of orthographic projection D1 shown in FIG. 2) of the impedance matching plate structure 120. In other words, the connecting pads 112-1 and 112-2 do not overlap with the impedance matching plate body 121 in the direction of orthographic projection.

In addition, in an extension direction of the impedance matching portion 123, a pitch distance DP1 is provided between the connecting pad 112-1 and the impedance matching portion 123. In the extension direction of the impedance matching portion 123, a pitch distance DP2 is provided between the connecting pad 112-2 and the impedance matching portion 123. The pitch distances DP1 and DP2 are greater than or equal to a minimum pitch distance of the design specification.

Figure 7:
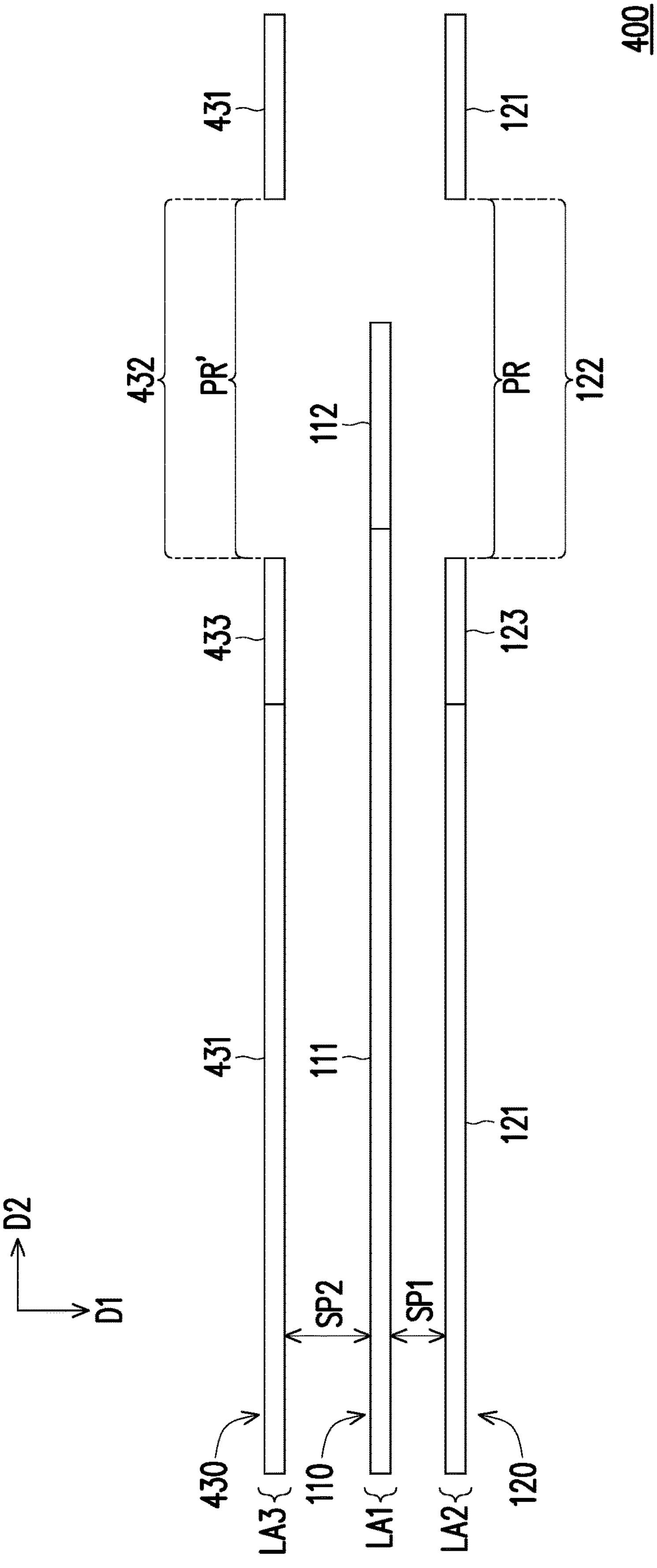
FIG. 7 is a schematic view of a high-frequency transmission element according to an embodiment of the disclosure.

Referring to FIG. 7, FIG. 7 is a schematic view of a high-frequency transmission element according to an embodiment of the disclosure. In this embodiment, the high-frequency transmission element 400 includes a connecting wire structure 110 and impedance matching plate structures 120 and 430. The connecting wire structure 110 is disposed in a first layer LA1 of the high-frequency transmission element 100. The connecting wire structure 110 includes a connecting wire 111 and a connecting pad 112. The connecting pad 112 is located at an end of the connecting wire 111.

The impedance matching plate structure 120 is disposed in a second layer LA2 of the high-frequency transmission element 100. The impedance matching plate structure 120 includes an impedance matching plate body 121, an opening 122, and an impedance matching portion 123. The impedance matching plate structure 430 is disposed in a third layer LA3 of the high-frequency transmission element 100. The impedance matching plate structure 430 includes an impedance matching plate body 431, an opening 432, and an impedance matching portion 433. The second layer LA2 and the first layer LA1 are separated by a non-zero pitch distance SP1. The third layer LA3 and the first layer LA1 are separated by a non-zero pitch distance SP2. In this embodiment, the pitch distance SP1 is equal to the pitch distance SP2. In some embodiments, the pitch distance SP1 is not equal to the pitch distance SP2. The first layer LA1 is located between the second layer LA2 and the third layer LA3. In this embodiment, the connecting wire structure 110 may be a stripline wire structure.

In this embodiment, the implementation details of the connecting wire structure 110 and the impedance matching plate structure 120 have been clearly described in the embodiments of FIG. 1, FIG. 2, FIG. 4A, FIG. 4B, and FIG. 4C, so they will not be repeated herein. In this embodiment, the connecting pad 112 is located in a projection range PR' of the opening 432 in the direction of orthographic projection D1 of the impedance matching plate structure 430. In other words, the connecting pad 112 does not overlap with the impedance matching plate body 431 in the direction of orthographic projection D1. The impedance matching portion 433 is located in a periphery of the opening 432 and extends in a direction D2 from the connecting wire 111 to the connecting pad 112.

In this embodiment, the design of the opening 432 is similar to the design of the opening 122. The design of the impedance matching portion 433 is similar to the design of impedance matching portion 123. Thus, the projection range PR' is similar to the projection range PR. The impedance matching plate body 431 may be a circuit board with an electrode structure or an electrode pattern. In some embodiments, the impedance matching plate body 431 may have a conductive layer.

The impedance matching portion 433 helps to realize the impedance matching between the connecting wire 111 and the connecting pad 112. In addition, since the connecting wire 111 is located between the impedance matching plate structure 120 and the impedance matching plate structure 430, the power dissipation loss of the connecting wire 111 may be reduced.

Figure 8:
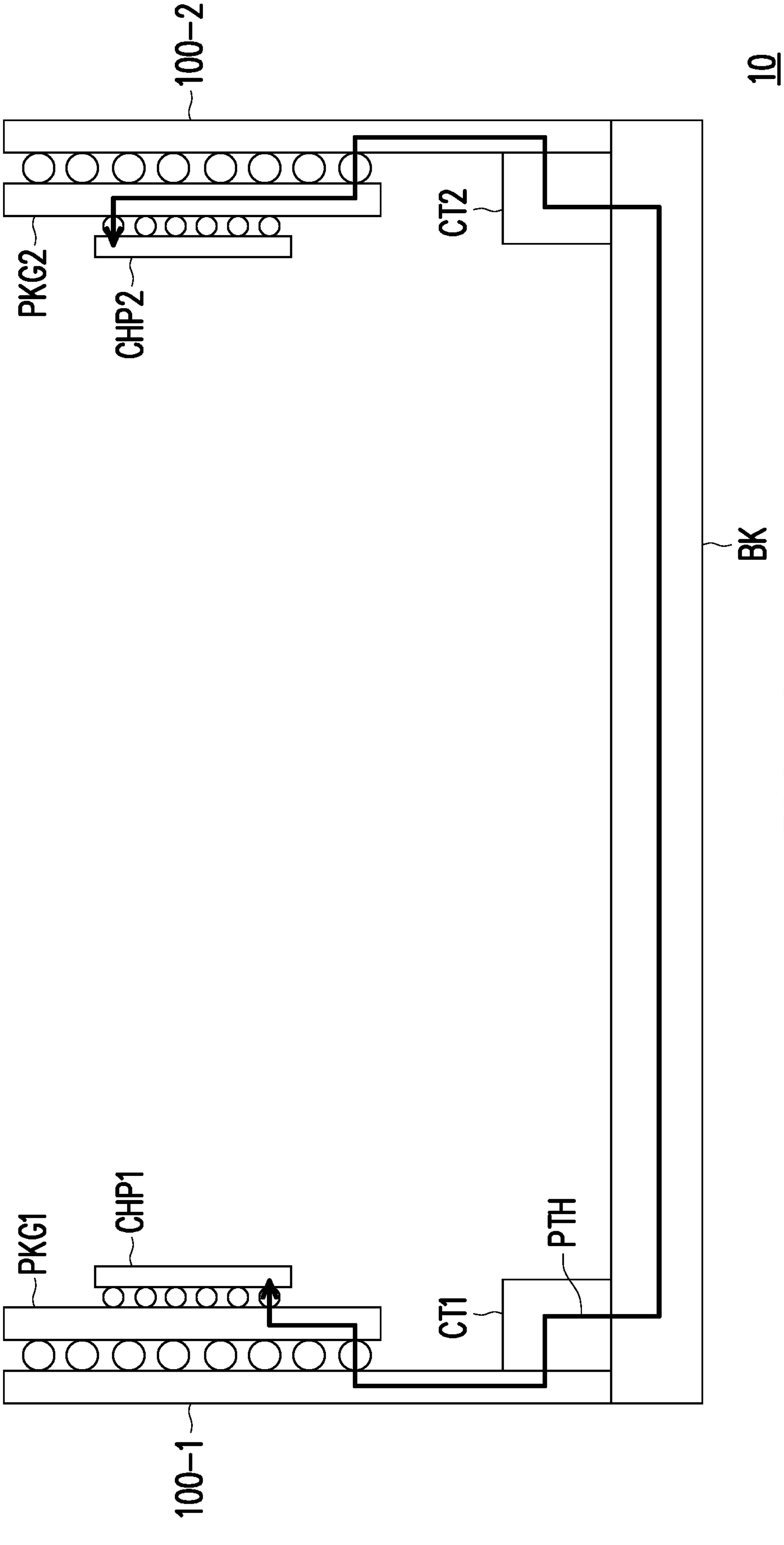
FIG. 8 is a schematic view of a high-frequency transmission system according to an embodiment of the disclosure.

Referring to FIG. 8, FIG. 8 is a schematic view of a high-frequency transmission system according to an embodiment of the disclosure. In this embodiment, a high-frequency transmission system 10 includes chips CHP1 and CHP2, carrying plates PKG1 and PKG2, high-frequency transmission elements 100-1 and 100-2, connectors CT1 and CT2, and a back plate BK. The chip CHP1 is disposed on the carrying plate PKG1. The carrying plate PKG1 is electrically connected to the high-frequency transmission element 100-1. The chip CHP2 is disposed on the carrying plate PKG2. The carrying plate PKG2 is electrically connected to the high-frequency transmission element 100-2. In addition, the back plate BK is electrically connected to the high-frequency transmission element 100-1 through the connector CT1 and electrically connected to the high-frequency transmission element 100-2 through the connector CT2. Thus, the carrying plates PKG1 and PKG2, the high-frequency transmission elements 100-1 and 100-2, the connectors CT1 and CT2, and the back plate BK form a transmission path PTH for transmitting high-frequency signals. The chip CHP1 may perform signal transmission with chip CHP2 through the transmission path PTH.

In this embodiment, the high-frequency transmission elements 100-1 and 100-2 may be respectively implemented by the high-frequency transmission element 100 shown in FIG. 1 and FIG. 2, the high-frequency transmission element 200 shown in FIG. 5, the high-frequency transmission element 300 shown in FIG. 6, or the high-frequency transmission element 400 shown in FIG. 7.

To sum up, the high-frequency transmission element uses the impedance matching portion to realize the impedance matching between the connecting wire structure and the connecting pad. Further, the high-frequency transmission element has a first capacitance between the impedance matching plate body and the connecting wire. The high-frequency transmission element has a second capacitance between the connecting pad and the opening. The first capacitance is significantly greater than the second capacitance. The impedance matching portion may buffer a difference between the first capacitance and the second capacitance. The impedance matching between the connecting wire and the connecting pad may be improved. In this way, internal losses such as return loss and insertion loss of the high-frequency signal may be reduced.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. A high-frequency transmission element, comprising:
a connecting wire structure, disposed in a first layer of the high-frequency transmission element, wherein the connecting wire structure comprises:
a connecting wire; and
a connecting pad, located at an end of the connecting wire;
a plurality of reference electrode structures, electrically connected to a reference voltage respectively; and
a first impedance matching plate structure, disposed in a second layer of the high-frequency transmission element, wherein the first impedance matching plate structure comprises:
a first impedance matching plate body;
a first opening, wherein the connecting pad is located in a projection range of the first opening in a direction of orthographic projection of the first impedance matching plate structure;
a first impedance matching portion, located in a periphery of the first opening and extending in a direction from the connecting wire to the connecting pad; and
a plurality of protruding structures, located in the periphery of the first opening and respectively surrounding one of the reference electrode structures,
wherein the protruding structures extend from the periphery of the first opening towards a direction of the connecting pad,
wherein the first layer and the second layer are separated by a non-zero pitch distance.

2. The high-frequency transmission element according to claim 1, wherein:
the first impedance matching portion has a structure width, and
the structure width gradually decreases in the direction from the connecting wire to the connecting pad.

3. The high-frequency transmission element according to claim 1, wherein a shape of the first impedance matching portion in a direction of orthographic projection of the first impedance matching plate structure is a triangle or a trapezoid.

4. The high-frequency transmission element according to claim 1, wherein the first impedance matching portion has a fixed structure width.

5. The high-frequency transmission element according to claim 1, wherein:
the high-frequency transmission element has a first capacitance between the connecting wire and the first impedance matching plate body,
the high-frequency transmission element has a second capacitance between the connecting wire and the first impedance matching portion, and the high-frequency transmission element has a third capacitance between the connecting pad and the first opening.

6. The high-frequency transmission element according to claim 5, wherein the second capacitance is between the first capacitance and the third capacitance.

7. The high-frequency transmission element according to claim 5, wherein the second capacitance gradually decreases the third capacitance from the first capacitance in the direction from the connecting wire to the connecting pad.

8. The high-frequency transmission element according to claim 1, further comprising:

a peripheral layer structure, disposed in the first layer, surrounding at least a portion of the connecting wire structure, and connected to the reference voltage through the reference electrode structures.

9. The high-frequency transmission element according to claim 1, further comprising:

a second impedance matching plate structure, disposed in a third layer of the high-frequency transmission element, wherein the second impedance matching plate structure comprises:

a second impedance matching plate body;

a second opening, wherein the connecting pad is located in a projection range of the second opening in a direction of orthographic projection of the second impedance matching plate structure; and a second impedance matching portion, located in a periphery of the second opening and extending in the direction from the connecting wire to the connecting pad, wherein the first layer and the third layer are separated by a non-zero pitch distance, and wherein the first layer is located between the second layer and the third layer.

* * * * *